United States Patent [19]
Suwa et al.

[11] Patent Number: 6,024,197
[45] Date of Patent: Feb. 15, 2000

[54] SUPPORT STRUCTURE FOR CLUTCH HUB

[75] Inventors: Hirotada Suwa; Kazuyoshi Yuge, both of Fuji, Japan

[73] Assignee: Jatco Corporation, Japan

[21] Appl. No.: 09/067,691

[22] Filed: Apr. 28, 1998

[30] Foreign Application Priority Data

May 12, 1997 [JP] Japan .................................. 9-135794

[51] Int. Cl.[7] ................................................ F16D 47/04
[52] U.S. Cl. ...................................... 192/48.92; 192/70.2
[58] Field of Search ............................... 192/48.3, 48.92, 192/70.2; 475/283, 318, 312

[56] References Cited

U.S. PATENT DOCUMENTS

| | | | |
|---|---|---|---|
| 1,176,796 | 3/1916 | Vincent | 192/70.2 X |
| 1,990,039 | 2/1935 | Lansing | 192/48.3 X |
| 2,558,738 | 7/1951 | Davis et al. | 475/318 X |
| 3,313,385 | 4/1967 | Forster | 192/70.2 |
| 3,841,452 | 10/1974 | Newsock et al. | 192/70.2 X |
| 4,438,663 | 3/1984 | Eichenberger et al. | 475/283 |
| 4,640,294 | 2/1987 | Ordo | 192/70.2 |
| 4,945,782 | 8/1990 | Farrell | 192/70.2 X |
| 5,267,917 | 12/1993 | Kadotani et al. | 192/48.92 X |
| 5,591,099 | 1/1997 | Tsukamoto et al. | 475/318 |

*Primary Examiner*—Rodney H. Bonck
*Attorney, Agent, or Firm*—Rossi & Associates

[57] ABSTRACT

A clutch hub includes a bottom wall, outer cylindrical portion and inner cylindrical portion that extend in the same axial direction from the bottom wall. The outer cylindrical portion has splines for engagement with friction plates on its outer circumferential surface. Splines formed on an outer circumferential surface of the inner cylindrical portion engage with splines formed on an inner circumferential surface of an inner race of a one-way clutch, so that the clutch hub and the inner race are connected with each other. With this arrangement, the clutch hub undergoes almost no radial displacement even if a large clearance exists between an output shaft and a hole of the clutch hub through which the output shaft is inserted. Further, the distance between the point to which a load due to the self-weight of the outer cylindrical portion and the weight of the friction plates are applied, and the point at which the clutch hub is supported by the inner race, is shortened, whereby the clutch hub is prevented from being excessively inclined. Thus, the posture of the clutch hub is less likely to be changed, and the life of a thrust bearing provided between the clutch hub and adjacent rotating member can be prolonged.

6 Claims, 3 Drawing Sheets

SUPPORT STRUCTURE FOR CLUTCH HUB

BACKGROUND OF THE INVENTION

1. Field of the Invention

The present invention relates to a support structure for a clutch hub used in an engaging device of a change-gear mechanism of an automatic transmission, in particular, a clutch hub having an outer cylindrical portion that engages with friction plates, and a bottom wall that engages at its central portion with another rotating member.

2. Description of the Prior Art

A change-gear mechanism of an automatic transmission is adapted to establish a plurality of gear positions by selectively engaging or releasing rotating elements linked with a plurality of gears in different combinations. The rotating elements may be engaged with or disengaged from each other by means of a clutch having a plurality of ring-like friction plates on each of its driving side and driven side, and the plural friction plates on one of the drive and driven sides are supported by a drum-like clutch hub having a cylindrical shape with a bottom, while the friction plates on the other side are supported by a drum-like rotating member.

On the driven side of the clutch, for example, axial splines are formed on the outer circumferential surface of a cylindrical portion of the clutch hub, and a plurality of driven-side friction plates having inner teeth are axially movably supported by the clutch hub, with the inner teeth held in engagement with the splines of the clutch hub. On the driving side, on the other hand, axial splines are formed on the inner circumferential surface of the drum-like rotating member, and a plurality of driving-side friction plates having outer teeth are axially movably supported by the rotating member, with the outer teeth held in engagement with the splines of the rotating member.

The clutch hub as described above is connected at a radially inner portion thereof on the center side of the bottom wall, with another rotating member. In the case of an overrun clutch, for example, the clutch is combined with a one-way clutch, so as to establish a selected one of a mode that permits overrunning of an output shaft of the transmission thereby to achieve the feeling of smooth running, and a mode that provides an engine brake effect.

Conventionally, the clutch hub of the overrun clutch and the one-way clutch are connected to each other as shown in FIG. 3. The clutch hub 51 of the overrun clutch 50 has a through hole 57 which is formed through a central portion of its bottom wall 53, to allow the output shaft 10 to pass therethrough. The bottom wall 53 also has a notch or hole 54 in the vicinity of the through hole 57. The one-way clutch 60 has an inner race 61 which is formed with a protrusion 62 that extends from one end face of the inner race 61 in the axial direction. This protrusion 62 engages with the hole 54 of the bottom wall 53, to be connected to the clutch hub 51, so that the clutch hub 51 and the inner race 61 are rotated together as a unit.

In the known connecting structure around the clutch hub, however, a certain clearance is present between the inner wall of the through hole 57 of the bottom wall 53 of the clutch hub and the output shaft 10, and a substantial radial clearance is also present between the protrusion 62 of the inner race 61 and the hole 54 of the clutch hub 51. With these clearances thus formed, the clutch hub 51 and the friction plates are automatically aligned with each other when the clutch hub 51 is rotated. Upon start of rotation of the clutch, however, the clutch hub 51 is displaced in the radial direction, and misalignment occurs between the bottom wall 53 of the clutch hub 51 and a thrust bearing 58 located between the bottom wall 53 and an adjacent rotating member 46, thus causing a problem that a case 59 for holding the bearing is twisted and stressed, and is likely to wear in an early period of use.

The through hole 57 of the clutch hub 51 through which the output shaft 10 is inserted is merely formed through the bottom wall 53 having a small thickness, and it is thus difficult to maintain the posture of the clutch hub 51 only by means of the output shaft 10. When the clutch hub 51 is not rotated, therefore, the clutch hub 51 is inclined relative to the output shaft 10. Accordingly, the clutch hub 51 undergoes changes in its posture, in addition to the above-described displacement in the radial directions each time the clutch starts being rotated or stops being rotated, which also accelerates wear of the thrust bearing 58.

SUMMARY OF THE INVENTION

The present invention has been developed in the light of the above situations. It is therefore an object to provide a support structure for a clutch hub, wherein the position and posture of the clutch hub can be surely maintained even while the clutch is not rotated, assuring prolonged life of a bearing provided adjacent to the clutch hub.

To accomplish the above object, there is provided according to present invention a support structure for supporting a clutch hub of a clutch in an automatic transmission, the clutch hub including a bottom wall that engages at a central portion thereof with a connecting member, and an outer cylindrical portion that engages with a plurality of first friction plates, the automatic transmission transmitting torque by pressing the first friction plates against a plurality of second friction plates that rotate with a member that is opposed to the outer cylindrical portion, so that the first and second friction plates contact with each other for engagement therebetween, wherein the clutch hub further includes an inner cylindrical portion formed at the central portion of the bottom wall, and wherein first splines are formed on the inner cylindrical portion of the clutch hub, and second splines are formed on the connecting member, the inner cylindrical portion and the connecting member being connected with each other due to engagement of the first and second splines.

In the support structure constructed as described above, the clutch hub engages with the connecting member with the splines formed over a certain axial length thereof, and is thus supported by the connecting member. In this arrangement, the amount of radial displacement of the clutch hub can be reduced, and the clutch hub is prevented from being excessively inclined. Accordingly, the life of a bearing provided between the clutch hub and an adjacent member can be prolonged.

In one preferred form of the invention, the inner cylindrical portion of the clutch hub extends in the same axial direction as the outer cylindrical portion. In this arrangement, the distance between the point to which a load due to the self-weight of the outer cylindrical portion and the weight of the friction plates is applied, and the point at which the clutch hub is supported by the connecting member, is shortened, and therefore the clutch hub is more surely prevented from being excessively inclined.

In another preferred form of the invention, the connecting member comprises an inner race of a one-way clutch, and the first splines are formed on an outer circumferential surface of the inner cylindrical portion of the clutch hub, while the second splines are formed on an inner circumferential surface of the inner race.

In the above structure in which the splines formed on the inner circumferential surface of the inner race of the one-way clutch engage with the splines formed on the outer circumferential surface of the inner cylindrical portion of the clutch hub, the one-way clutch is accommodated in a space between the inner and outer cylindrical portions of the clutch hub, whereby the change-gear mechanism of the transmission can be made compact or small-sized.

In a further preferred form of the invention, the bottom wall of the clutch hub is provided with a protruding portion that extends in a direction opposite to the inner cylindrical portion, and a bearing is provided between the bottom wall and an axial adjacent member, such that the bearing is supported by the protruding portion. In this case, the clutch hub and the adjacent member can be assembled together with high efficiency.

BRIEF DESCRIPTION OF THE DRAWINGS

The invention will be described in greater detail with reference to a preferred embodiment thereof and the accompanying drawings, wherein.

DETAILED DESCRIPTION OF THE PREFERRED EMBODIMENT

A preferred embodiment of the present invention will be now explained in detail.

Figure 1:
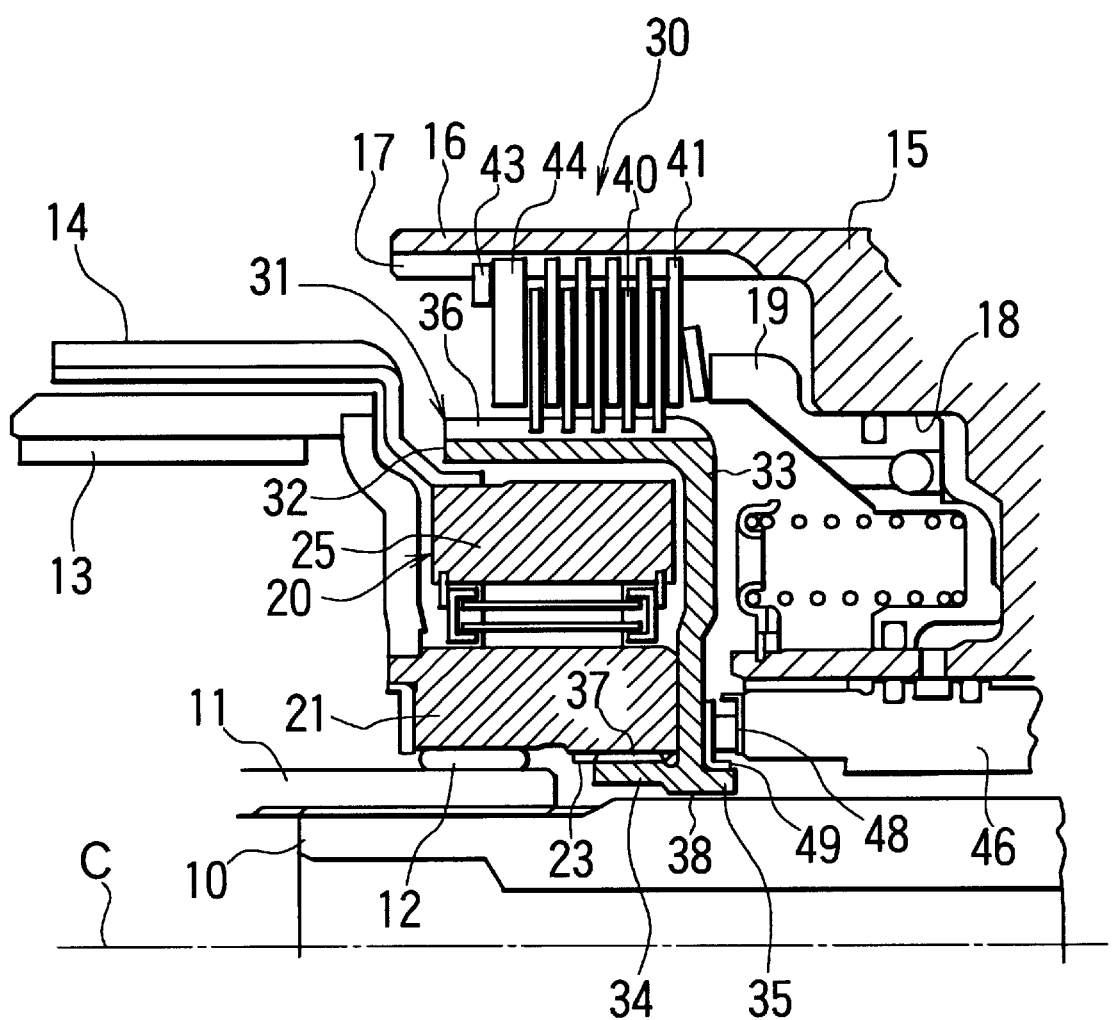
FIG. 1 is a cross-sectional view showing the construction of one embodiment of the present invention.
Figure 2:
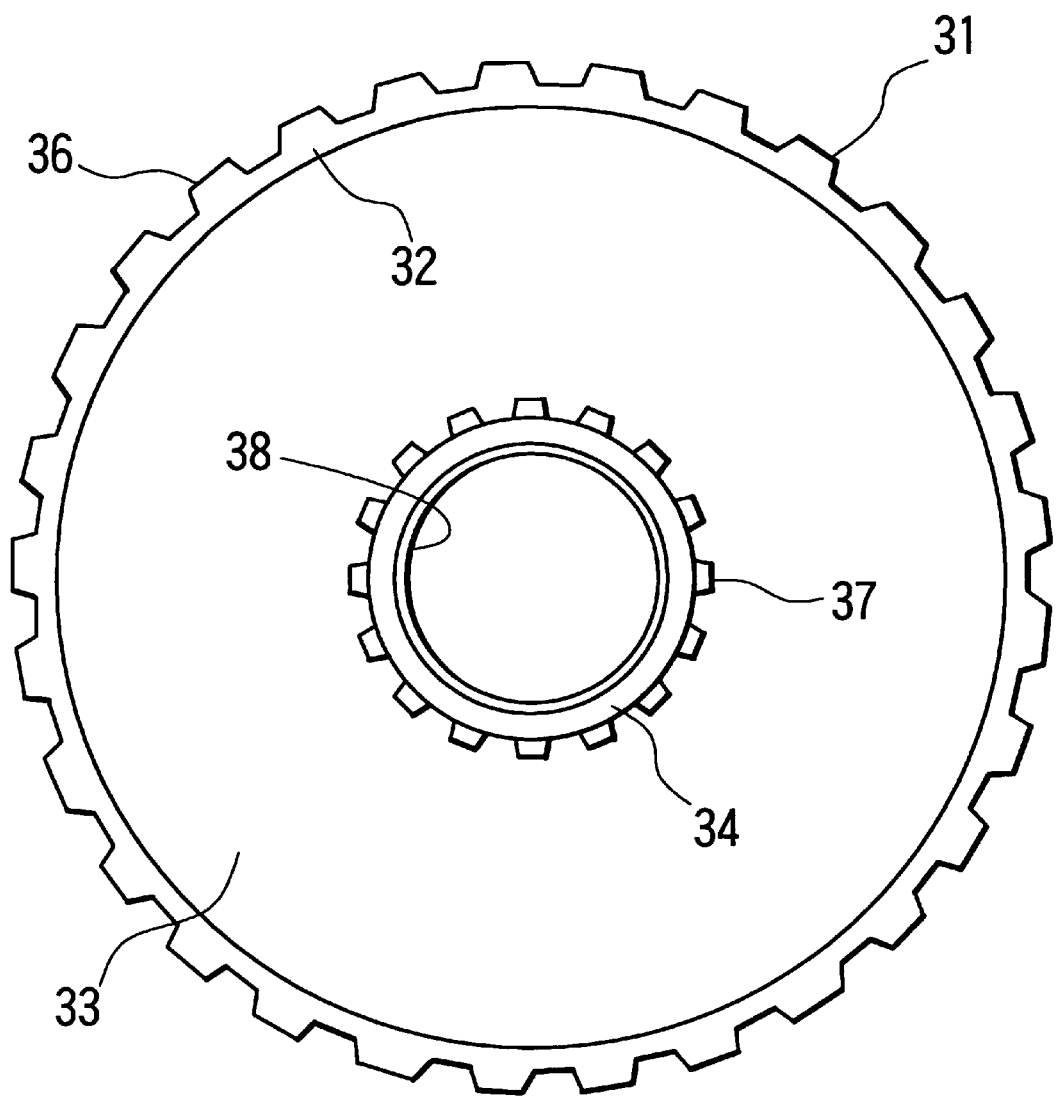
FIG. 2 is a front view of a clutch hub as viewed from the left side in FIG. 1.
Figure 3:
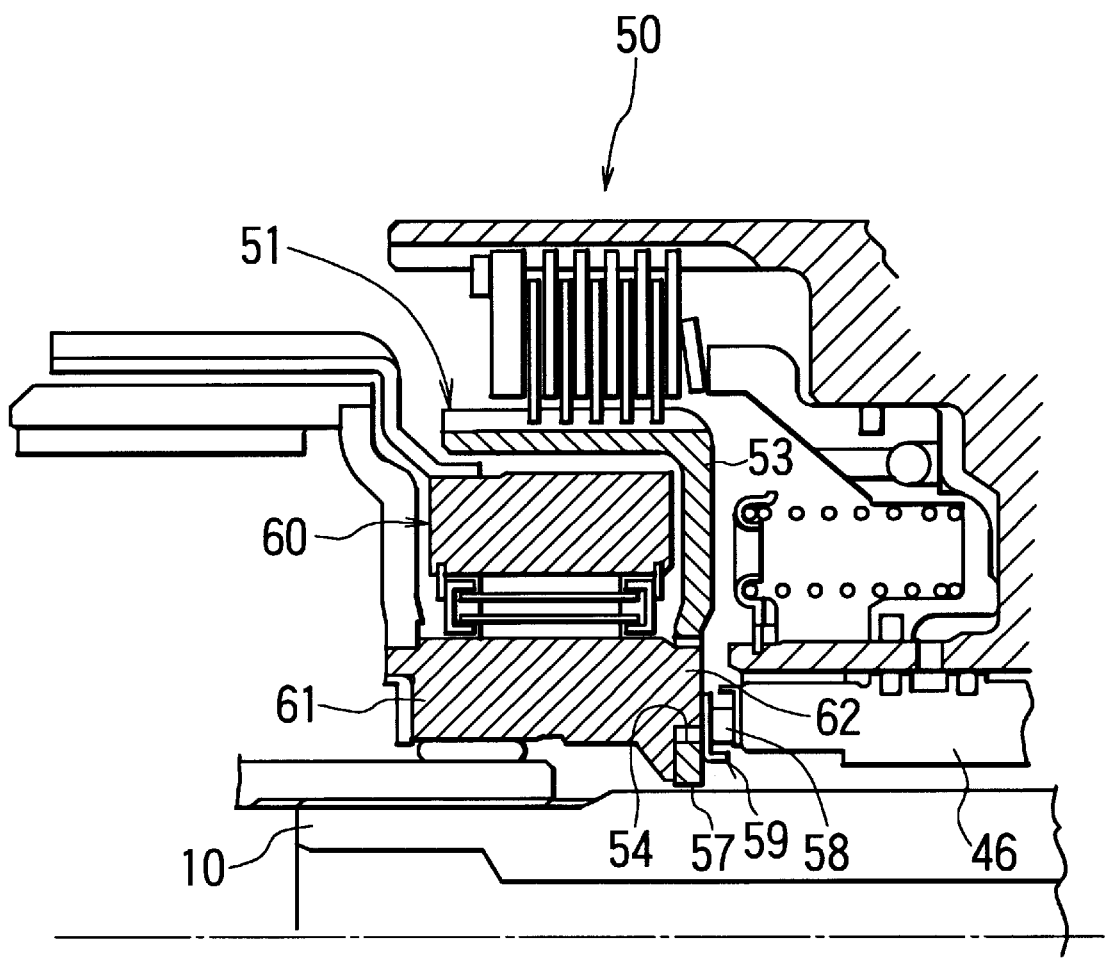
FIG. 3 is a cross-sectional view showing a known example.

FIG. 1 is a cross-sectional view showing the construction of the preferred embodiment where the present invention is applied to a connecting portion of a clutch hub of an overrun clutch and a one-way clutch in an automatic transmission of a motor vehicle. FIG. 2 is a front view of the clutch hub as viewed from the left side in FIG. 1.

An output shaft 10 is inserted through a first rotating member 11 such that the rotating member 11 and output shaft 10 are rotated as a unit about the center axis C of rotation, and an inner race 21 of a one-way clutch 20 is supported on the first rotating member 11 via a needle bearing 12. The first rotating member 11 extends in the axial direction such that one of its axial ends is located at an axially middle position of the inner race 21.

The inner race 21 of the one-way clutch 20 is connected to an input-side rotating member 13 provided on the side of the engine (not shown), and an outer race 25 of the clutch 20 is connected to a second rotating member 14 that leads to the output shaft of the transmission.

The overrun clutch 30 is constructed such that a plurality of friction plates are arranged between a clutch hub 31 that is rotatably disposed on the output shaft 10, and a third rotating member 15 leads to the output shaft of the transmission.

The clutch hub 31 having a drum-like shape includes an outer cylindrical portion 32 which extends in the axial direction along the outer race 25 of the one-way clutch 20, to thus overlap the one-way clutch 20 as viewed in the radial direction. The clutch hub 31 further includes a bottom wall 33, inner cylindrical portion 34 formed on the side of the center of the bottom wall 33 so as to extend in the same direction as the outer cylindrical portion 32, and a protruding portion 35 that protrudes from the bottom wall 33 in the direction opposite the inner cylindrical portion 34. The inner circumferential surface of the protruding portion 35 and the thickness portion of the bottom wall 33 define a through hole 38 through which the output shaft 10 is inserted.

The third rotating member 15 also assumes a drum-like shape, and includes a cylindrical portion 16 that is opposed to the outer cylindrical portion 32 of the clutch hub 31.

Axial splines 36 are formed on the outer circumferential surface of the outer cylindrical portion 32 of the clutch hub 31, and axial splines 17 are formed on the inner circumferential surface of a cylindrical portion 16 of the third rotating member 15. On the other hand, a plurality of driven-side friction plates 40 having inner teeth engaging with the splines 36 of the outer cylindrical portion 32, and a plurality of drive-side friction plates 41 having outer teeth engaging with the splines 17 of the cylindrical portion 16 are alternately arranged in the axial direction. These friction plates 40, 41 can be pressed by and between a piston 19 that slides in the axial direction within an annular cylinder 18 formed in the third rotating member 15, and a retainer 44 that is fixed to the cylindrical portion 16 by means of a snap ring 43.

The inner cylindrical portion 34 of the clutch hub 31 extends in the axial direction to a point close to the above-indicated one axial end of the first rotating member 11, and splines 37 are formed on the outer circumferential surface of the inner cylindrical portion 34. On the side of the inner race 21 as a connecting member that connects with the clutch hub 31, splines 23 for engaging with the splines 37 are formed on a portion of the inner circumferential surface of the inner race 21 which faces the inner cylindrical portion 34. With this arrangement, the clutch hub 31 and inner race 21 are rotated together as a unit.

On the side of the clutch hub 31 (or bottom wall 33) opposite to the inner cylindrical portion 34, on the other hand, a thrust bearing 48 is provided between the bottom wall 33 and one axial end of a fourth rotating member 46 as an adjacent member, and a holding case 49 for holding one side of the thrust bearing 48 is supported by the protruding portion 35 of the clutch hub 31.

The overrun clutch 30 and one-way clutch 20 of the automatic transmission constructed as described above operate in the following manner during running of the vehicle. When the vehicle is normally running on a flat road, or the like, with a drive range being selected, the overrun clutch 30 is placed in a released state. In this state, driving torque from the engine is transmitted to the inner race 21 of the one-way clutch 20 via the input-side rotating member 13, to drive the second rotating member 14 through the engagement between the inner race 21 and outer race 25, and then transmitted from the output shaft 10 to wheels (not illustrated). If the driving torque from the engine is reduced due to a change in the amount of depression of an accelerator pedal operated by the driver during normal running of the vehicle, and the driving torque from the wheels due to the inertia is increased to be larger than the torque from the engine, the inner race 21 and outer race 25 of the one-way clutch 20 are disengaged from each other, thereby to be freely movable, and the torque transmission between the engine and the wheels is disconnected. Thus, variations in the torque of the engine, or the like, do not appear directly as irregular or sudden vibrations of the vehicle, and thus the feeling of smooth running can be obtained.

When the vehicle is running on a downhill, for example, with a low-speed range being selected, on the other hand, the overrun clutch 30 is placed in the engaged state, and the clutch hub 31 having the inner cylindrical portion 34 connected to the inner race 21 due to engagement of the splines 23, 37 is connected to the third rotating member 15 that leads to the output shaft. As a result, reverse driving torque is transmitted from the wheels to the engine, whereby an engine brake effect can be provided.

In the present embodiment constructed as described above, the inner race 21 of the one-way clutch 20 is highly accurately supported via the bearing 12 by the first rotating member 11 serving as a support shaft. Further, the clutch hub 31 of the overrun clutch 30 is supported by the inner race 21 with a suitable length of splines formed on the hub 31 and inner race 21 being in engagement with each other. Accordingly, almost no radial displacement of the clutch hub 31 occurs even if a relatively large clearance exists between the output shaft 10 and the through hole 38 of the clutch hub 31 through which the output shaft 10 is inserted.

In the arrangement in which the inner cylindrical portion 34 provided with the splines 37 extends in the same direction as the outer cylindrical portion 32, a distance between the point to which a load due to the self-weight of the outer cylindrical portion 32 and the weight of the friction plates 40, 41 is applied and the point at which the clutch hub 31 is supported by the inner race 21 is shortened, whereby the clutch hub 31 is prevented from being excessively inclined. Accordingly, no torsional stress is applied to the holding case 49 of the thrust bearing 48 supported by the protruding portion 35 of the clutch hub 31.

Since the inner cylindrical portion 34 and outer cylindrical portion 32 extend in the same direction, the one-way clutch 20 can be accommodated in a space between the inner and outer cylindrical portions 32, 34 of the clutch hub 31, thus making the change-gear mechanism compact or small-sized.

When mounting the thrust bearing 48 between the bottom wall 33 of the clutch hub 31 and one axial end of the adjacent fourth rotating member 46, the holding case 49 is supported by the protruding portion 35 of the clutch hub 31, so as to hold the thrust bearing 48 in position.

While the present invention is applied to the connecting portion of the clutch hub of the overrun clutch and the one-way clutch in the illustrated embodiment, this invention is not limited to this application, but may be applied to various structures for supporting a clutch hub in a change-gear mechanism of an automatic transmission, wherein the clutch hub engages at its outer cylindrical portion with friction plates, and also engages at its center portion with another rotating member.

What is claimed is:

1. A clutch apparatus for an automatic transmission including a clutch hub comprising:

a bottom wall that engages at a central portion thereof with a connecting member, an outer cylindrical portion that engages with a plurality of driven side friction plates, wherein said automatic transmission transmits torque by pressing the driven side friction plates against a plurality of driving side friction plates that rotate with a third rotating member that is opposed to the outer cylindrical portion, so that the driven side and driving side friction plates contact and engage with each other, and an inner cylindrical portion formed at the central portion of the bottom wall, wherein first splines are formed on the outer circumference of the inner cylindrical portion of the clutch hub, and second splines are formed on the connecting member, the inner cylindrical portion and the connecting member being connected with each other due to engagement of the first and second splines.

2. A clutch apparatus according to claim 1, wherein said inner cylindrical portion of said clutch hub extends in the same direction as said outer cylindrical portion.

3. A clutch apparatus according to claim 2, wherein said connecting member comprises an inner race of a one-way clutch, and said second splines are formed on an inner circumferential surface of the inner race.

4. A clutch apparatus according to claim 2, wherein said bottom wall of said clutch hub is provided with a protruding portion that extends in a direction opposite to said inner cylindrical portion, and a bearing is provided between the bottom wall and an adjacent member that extends in an axial direction of the structure, said bearing being supported by said protruding portion.

5. A clutch apparatus according to claim 3, wherein said bottom wall of said clutch hub is provided with a protruding portion that extends in a direction opposite to said inner cylindrical portion, and a bearing is provided between the bottom wall and an adjacent member that extends in an axial direction of the structure, said bearing being supported by said protruding portion.

6. A clutch apparatus as claimed in claim 1, wherein the first splines are arranged at spaced intervals around the entire outer circumference of the inner cylindrical portion.

* * * * *